United States Patent
Hsu et al.

(10) Patent No.: US 7,039,482 B2
(45) Date of Patent: May 2, 2006

(54) FLOATING PROCESS FLOW CONTROL SYSTEM TO HANDLE OPERATION EVENTS IN A FULL AUTOMATION PLANT

(75) Inventors: Hsien-Jung Hsu, Hsinchu (TW); Larry Jann, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 272 days.

(21) Appl. No.: 10/694,683

(22) Filed: Oct. 28, 2003

(65) Prior Publication Data

US 2005/0090924 A1 Apr. 28, 2005

(51) Int. Cl.
*G06F 19/00* (2006.01)

(52) U.S. Cl. .......... 700/99; 100/108; 100/110; 100/121; 703/22

(58) Field of Classification Search .......... 700/97, 700/99, 100, 101, 102, 108, 110, 112, 121; 703/22
See application file for complete search history.

(56) References Cited

U.S. PATENT DOCUMENTS

| | | | | |
|---|---|---|---|---|
| 5,612,863 A | | 3/1997 | De Lange | 364/468.07 |
| 6,470,227 B1 | * | 10/2002 | Rangachari et al. | 700/95 |
| 6,546,364 B1 | | 4/2003 | Smirnov et al. | 703/22 |
| 6,684,121 B1 | * | 1/2004 | Chen et al. | 700/108 |
| 6,810,294 B1 | * | 10/2004 | Rangachari et al. | 700/97 |
| 2003/0176940 A1 | * | 9/2003 | Rangachari et al. | 700/121 |
| 2003/0195646 A1 | * | 10/2003 | Yang et al. | 700/96 |
| 2003/0225474 A1 | * | 12/2003 | Mata et al. | 700/121 |
| 2004/0039469 A1 | * | 2/2004 | Lin | 700/100 |
| 2004/0267641 A1 | * | 12/2004 | Chang et al. | 705/28 |

* cited by examiner

*Primary Examiner*—Leo Picard
*Assistant Examiner*—Douglas S. Lee
(74) *Attorney, Agent, or Firm*—Haynes and Boone, LLP

(57) ABSTRACT

A method to handle operation exceptions in an automated manufacturing system is achieved. The method comprises providing an automated manufacturing system comprising a means to track progress of work in process against standard process flows and a means to select product lots for processing from the work in process and to select equipment for processing the product lots based on next step information from the standard process flows. The automated manufacturing system is monitored for operation exception events. The product lots must deviate from the standard process flows. A floating process flow is selected corresponding to the operation exception event and the product lots from a floating process flow database. The floating process flow is linked to the standard process flow such that the next step is derived from the floating process flow. Manufacturing is continued using the floating process flow. The floating process flow is unlinked from the standard process flow such that the next step is derived from the standard process flow when the floating process flow is completed. A control system apparatus for handling operation exceptions in an automated manufacturing plant is achieved.

25 Claims, 5 Drawing Sheets

| TIME SEQ. | INVOLVED UNITS | | | | | | | ACTIVITY |
|---|---|---|---|---|---|---|---|---|
| | Trans. System | Dispatch System | Operation System | Control Unit | Mgmt. Unit | Data Unit | Recipe Unify | |
| STEP 1 | | | | | X | X | X | Input floating process flow through management unit & keep on data unit. Unify flow by recipe unification. |
| STEP 2 | | | X | | | | | Operation interface receives external trigger and passes it to control unit. Trigger may be operator of system. |
| STEP 3 | | | | X | | X | | Control unit extracts a proper floating process flow from a data unit. Connect floating to standard flow. |
| STEP 4 | X | | | X | | | | Control unit triggers a transportation system to move a lot to equipment of 1st oper. in floating process flow. |
| STEP 5 | X | X | | | | | | Dispatch and transport system control lot movement in full automation mode. |
| STEP 6 | | | | X | | X | | When floating flow complete, return to standard flow. Control unit destroys connection between flows. |

FIG. 6

FLOATING PROCESS FLOW CONTROL SYSTEM TO HANDLE OPERATION EVENTS IN A FULL AUTOMATION PLANT

BACKGROUND OF THE INVENTION (1) Field of the Invention

The invention relates to a method to control a manufacturing plant, and, more particularly, to an automated manufacturing control system capable of automated handling of operation exceptions.

(2) Description of the Prior Art

In the field integrated circuit manufacturing, much effort is being expended in the area of automation. In particular, manufacturers are moving toward fully automated fabrication operation or FABs. This movement is occurring due to a desire to reduce labor costs and because of a growing recognition of human limitations encountered in handling ever larger-sized integrated circuit wafers. Referring now to FIG. 1, the architecture 10 of an unmanned FAB is illustrated in a very simplified schematic. The schematic shows a collection of processing equipment EQ1–EQ6 38, 42, 46, 50, 54, and 58. In a wafer FAB, this equipment may comprise processing tools such as those used to deposit thin films, to perform photolithography, to perform thermal processing, or to implant ionic species as is well known in the art. In the unmanned FAB, production wafers, often collected in batches called lots, move around from equipment location to equipment location by means of an automated transportation system 34. This automated transportation system 34 may comprise fixed material handling conveyances or may comprise smart vehicles or robot devices as are known in the art. Whatever the physical means of movement, the transportation system is controlled by a computer system 26.

A wafer FAB is typically organized around the concepts of work-in progress and dispatching. Integrated circuit manufacturing generally requires many processing steps. Therefore, the total processing cycle time is typically in the range of several weeks. Therefore, at any given time a large quantity of product lots are present in the FAB, and each of these product lots is currently at some step in its overall process flow. The sum total of product lots in the FAB at any given time is called the work-in process or WIP. At any given time, product lots in the total WIP may be moving from WIP storage 30 to a particular process tool EQ1–EQ6, from one tool to another tool, or from a tool to the WIP storage 30.

To run the FAB profitably and to meet customer delivery schedules, it is vital that the manufacturer carefully control the movement of WIP through the process steps and the utilization of the limited processing equipment. The control of WIP movement and equipment utilization is performed by a manufacturing information system (MIS) and dispatch controller 14. In the dispatch process, the controller decides, perhaps under semi-automated control, which product lots from the WIP will be moved into a process tool EQ1–EQ6. The WIP tracking database 22 is used to track the present location of any product lot in the FAB as well as to log the processing history.

Most FABs are capable of producing a variety of integrated circuit devices. Further, different products may require different sequences of process steps or even process steps that are unique to individual products. Therefore, each product or product family will have a unique process flow. These process flows are stored in a main process flow database 18. The MIS/DISPATCH controller 14 accesses the WIP tracking data 22 and the process flow data 18 to determine where a product is in its process flow and where it should go next. In addition to the step sequence, the main process flow database 18 may contain recipe or equipment parameters that are unique for that product at any given step. This information is passed from the process flow database 18, through the MIS controller 18 and down to the selected process tool EQ1–EQ6 to insure that the product is run with the correct recipe.

The unmanned FAB architecture 10 works well as long as the product lots and the equipment are operating along the strict process flows 18. However, this architecture is not capable of handling operation exceptions while remaining in full-automation mode. Operation exceptions EX1 62, EX2 66, and EX3 70, are unscheduled events that occur during routine operations. Operation exceptions cause the product to deviate from the standard process flows defined in the main process flow database 18. For example, a wafer carrier may reach its cleaning date, or a quality monitoring may reveal a need for an N2 purge operation, or a process tool may reach a maintenance trigger, or a group of monitor lots needs to be created to check equipment performance. Operation exceptions occur very frequently in an operating FAB. However, these events are not governed by the main process flows and are difficult to integrate into the full-automation operation. Therefore, it found that about 50% of the required operator effort in the FAB is expended on servicing these operation exception events. It is therefore desirable to better integrate operation exception events into the full-automation control architecture.

Several prior art inventions relate to manufacturing control systems. U.S. Pat. No. 5,612,886 to Weng describes a method and a system to perform dynamic dispatching in a semiconductor manufacturing plant. The invention combines the work in progress (WIP) release policy and the dispatching method such that high-priority WIP processing is optimized at the same time throughput is optimized. U.S. Pat. No. 6,546,364 B1 to Smirnov et al describes an adaptive workflow system with a schedule engine and a workflow engine. The workflow engine monitors task execution for deviations of task executions and triggers the schedule engine to build new workflows for as yet uncompleted tasks using a model of the manufacturing environment.

SUMMARY OF THE INVENTION

A principal object of the present invention is to provide an effective and very manufacturable method and apparatus to control an automated manufacturing process.

A further object of the present invention is to provide a control system suitable for an unmanned FAB.

A yet further object of the present invention is to provide a method to handle operation exceptions.

A yet further object of the present invention is to reduce the product cycle time lost while waiting on operator or engineering action due to operation exceptions.

A yet further object of the present invention is to improve equipment efficiency by continuing to process on full-automatic mode during operation exception events.

A yet further object of the present invention is to increase FAB throughput.

A yet further object of the present invention is to save engineering time by reducing the number of possible process flows and conditions that must be maintained in the main process flow database.

In accordance with the objects of this invention, a method to handle operation exceptions in an automated manufacturing system is achieved. The method comprises providing an automated manufacturing system comprising a means to track progress of work in process against standard process flows and a means to select product lots for processing from the work in process and to select equipment for processing the product lots based on next step information from the standard process flows. The automated manufacturing system is monitored for operation exception events where the product lots must deviate from the standard process flows. A floating process flow is selected corresponding to the operation exception event and the product lots from a floating process flow database. The floating process flow is linked to the standard process flow such that the next step is derived from the floating process flow. Manufacturing is continued using the floating process flow. The floating process flow is unlinked from the standard process flow such that the next step is derived from the standard process flow when the floating process flow is completed.

Also in accordance with the objects of this invention, an apparatus to control floating process flows in an automated manufacturing system is achieved. The apparatus comprises an operation interface to monitor the automated manufacturing system for operation exception events where the product lots must deviate from the standard process flows. A management unit creates, updates, and deletes floating process flows. A data unit stores the floating process flows. A control unit selects the floating process flows corresponding to the operation exception events.

Also in accordance with the objects of this invention, an apparatus to control an automated manufacturing system is achieved. The apparatus comprises a means to track progress of work in process against standard process flows. A means to select the product lots for processing from the work in process and to select equipment for processing the product lots based on next step information from the standard process flows is included. A means to control floating process flows in an automated manufacturing system is included. The means comprises an operation interface to monitor the automated manufacturing system for operation exception events where the product lots must deviate from the standard process flows. A management unit is used to create, update, and delete floating process flows. A data unit stores the floating process flows. A control unit selects the floating process flows corresponding to the operation exception events.

BRIEF DESCRIPTION OF THE DRAWINGS

In the accompanying drawings forming a material part of this description, there is shown:

FIG. 6 illustrates a preferred embodiment of the present invention showing time sequence relationships between various events.

DESCRIPTION OF THE PREFERRED EMBODIMENTS

The preferred embodiments of the present invention disclose a method and an apparatus to control a manufacturing plant. In particular, the method and apparatus are directed to handling operation exception events that cause deviation from the standard process flow. The invention allows for full automation operation of the manufacturing process by dynamically connecting the standard process flow to a floating process flow when an operation exception event occurs. It should be clear to those experienced in the art that the present invention can be applied and extended without deviating from the scope of the present invention.

Figure 1:
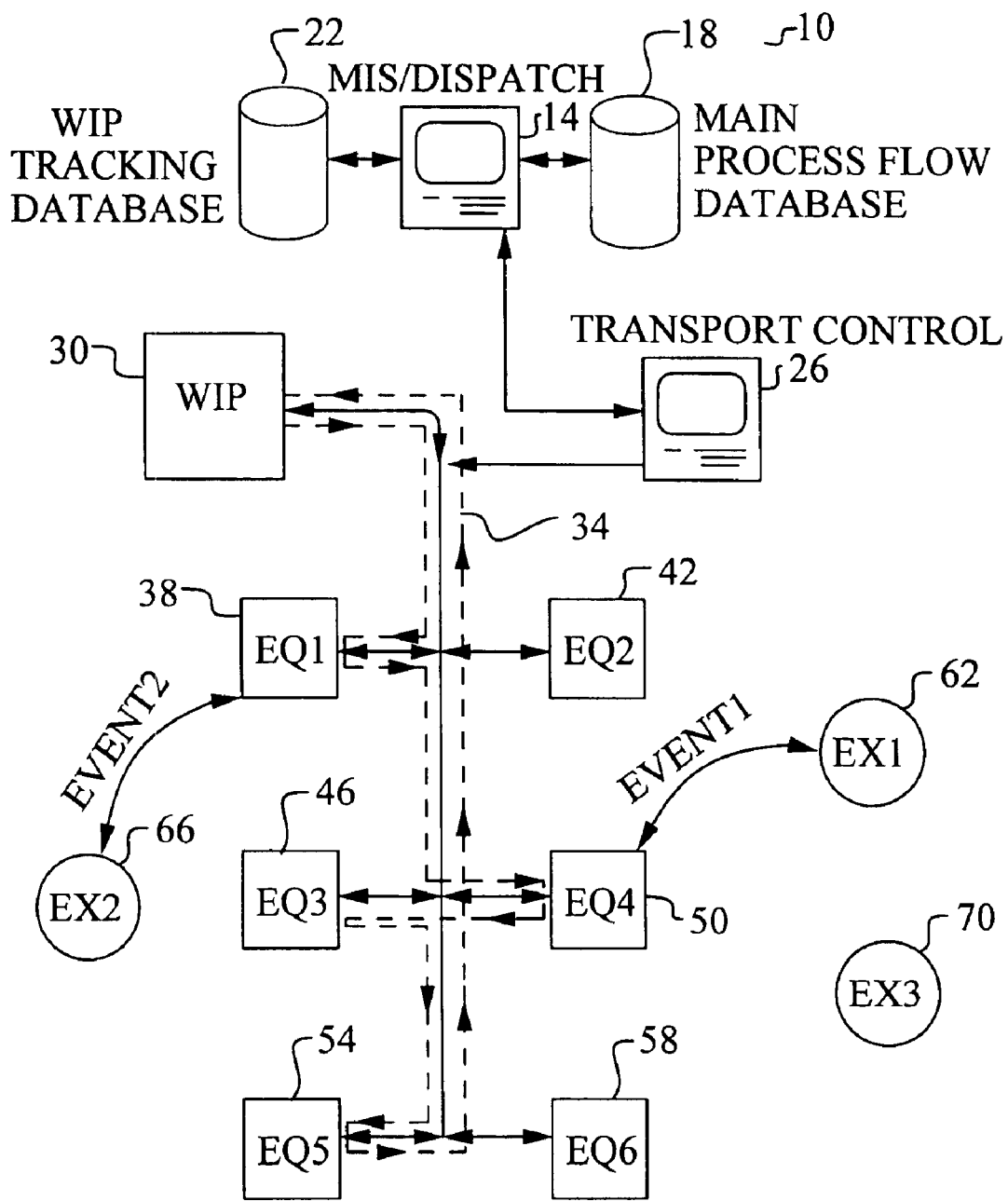
FIG. 1 illustrates an architecture of a prior art, automated manufacturing system.
Figure 2:
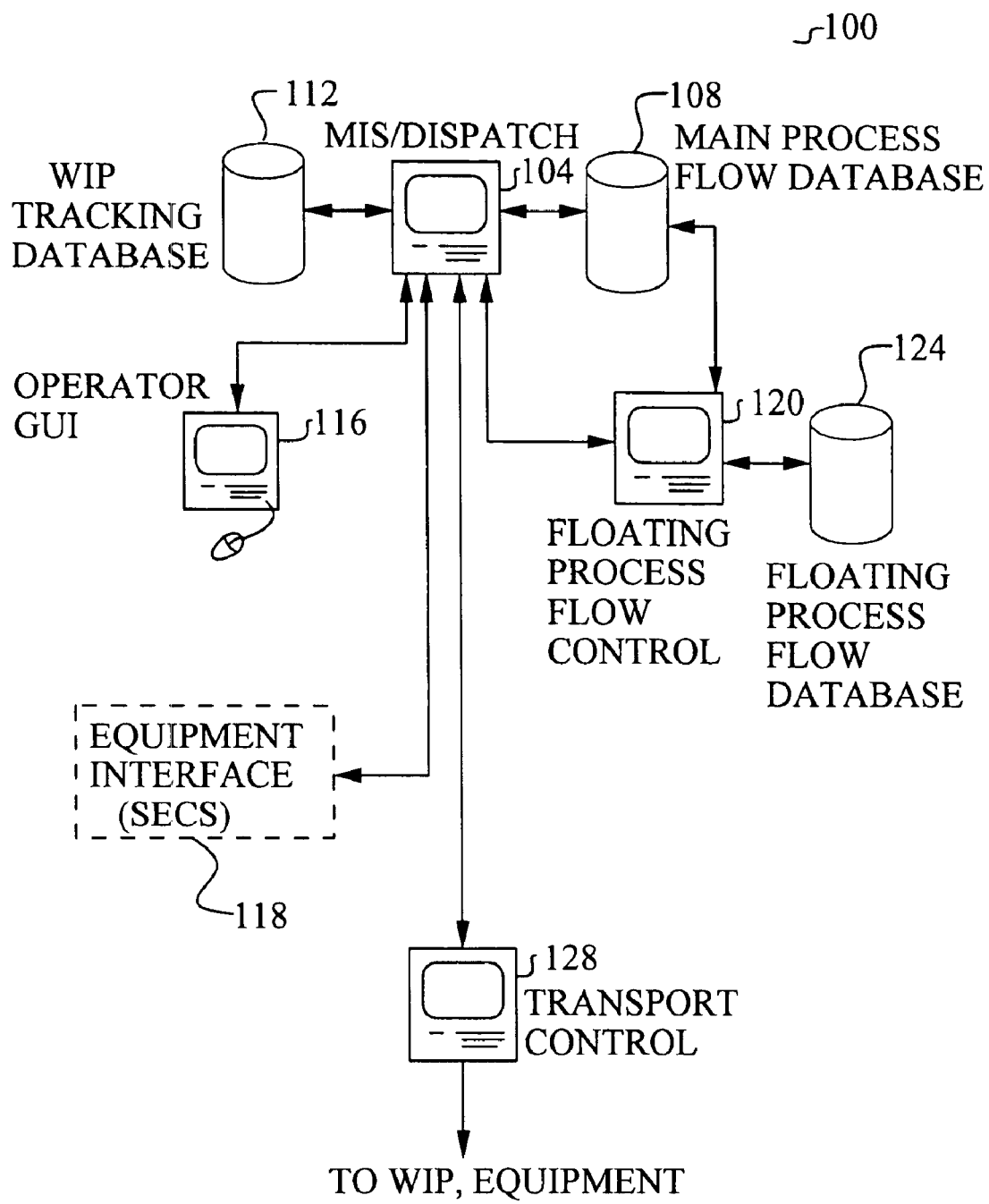
FIG. 2 illustrates a preferred embodiment of the present invention showing a system architecture of an automated manufacturing system capable of handling operation exceptions.

Referring now to FIG. 2, a preferred embodiment of the present invention is illustrated. Several important features of the present invention are shown and discussed below. An apparatus 100 for controlling an automated manufacturing plant is described. As in the prior art case, an MIS/dispatch controller 104 is used to track progress of work in process (WIP) in the WIP tracking database 112 against standard process flows kept in the main process flow database 108. The MIS/dispatcher 104 selects the product lots for processing from the WIP database 112 and selects equipment for processing the product lots based on next step information from the standard process flow database 108. The MIS/dispatch unit 104 directs the transport control unit 128 to automatically move product in the manufacturing plant as described in the prior art. The equipment is not shown on this schematic for simplification of illustration.

As an important feature of the present invention, a floating process control unit 120 is provided to control floating process flows in the automated manufacturing system. A floating process flow is a standard operation procedure (SOP) that has been constructed to handle a specific operation exception event. For example, a SOP may be generated to handle a type of $N_2$ purge that occasionally must be performed in connection with a particular process. The floating process flow for this $N_2$ purge is maintained in a floating process flow database 124 where it can be created, edited, and/or deleted by the engineering staff. Further, the floating process flows in the database 124 can be automatically accessed by the floating process control unit 120 whenever an operation exception event occurs.

As another important feature of the present invention, operation interfaces 116 and 118 monitor the automated manufacturing system 100 for operation exception events where the product lots must deviate from the standard process flows provided by the main process flow database 108. Operation exceptions are preferably registered into the automated manufacturing system in one of two ways. First, an operator graphical interface (GUI) 116 is supplied. Using the operator GUI, a FAB operator can enter an operation exception event by simply clicking with an input device, such as a mouse, or by using a keyboard. Second, the FAB process equipment may be interfaced into the automated control system 100 using, for example, a semiconductor equipment communication standard (SECS) interface. In this way, operation exceptions can be triggered automatically by the process equipment.

In either case, once an operation exception event is logged into the system, the floating process flow control controller 120 automatically selects the correct floating process flow from the database 124. The system then automatically connects the selected floating process flow and the standard process flow for the product lot such that standard process flow effectively branches to the floating process flow beginning at the next process step. Then, the floating process flow is used to direct the processing of the product lot, step-by-step, until the floating process flow is completed. When the floating process flow has been completed, the chain of control returns to the standard process flow beginning at the processing step where the operation exception occurred. In this way, the present invention handles the operation exception event while maintaining full-automation manufacturing and while substantially limiting operator intervention.

Figure 3:
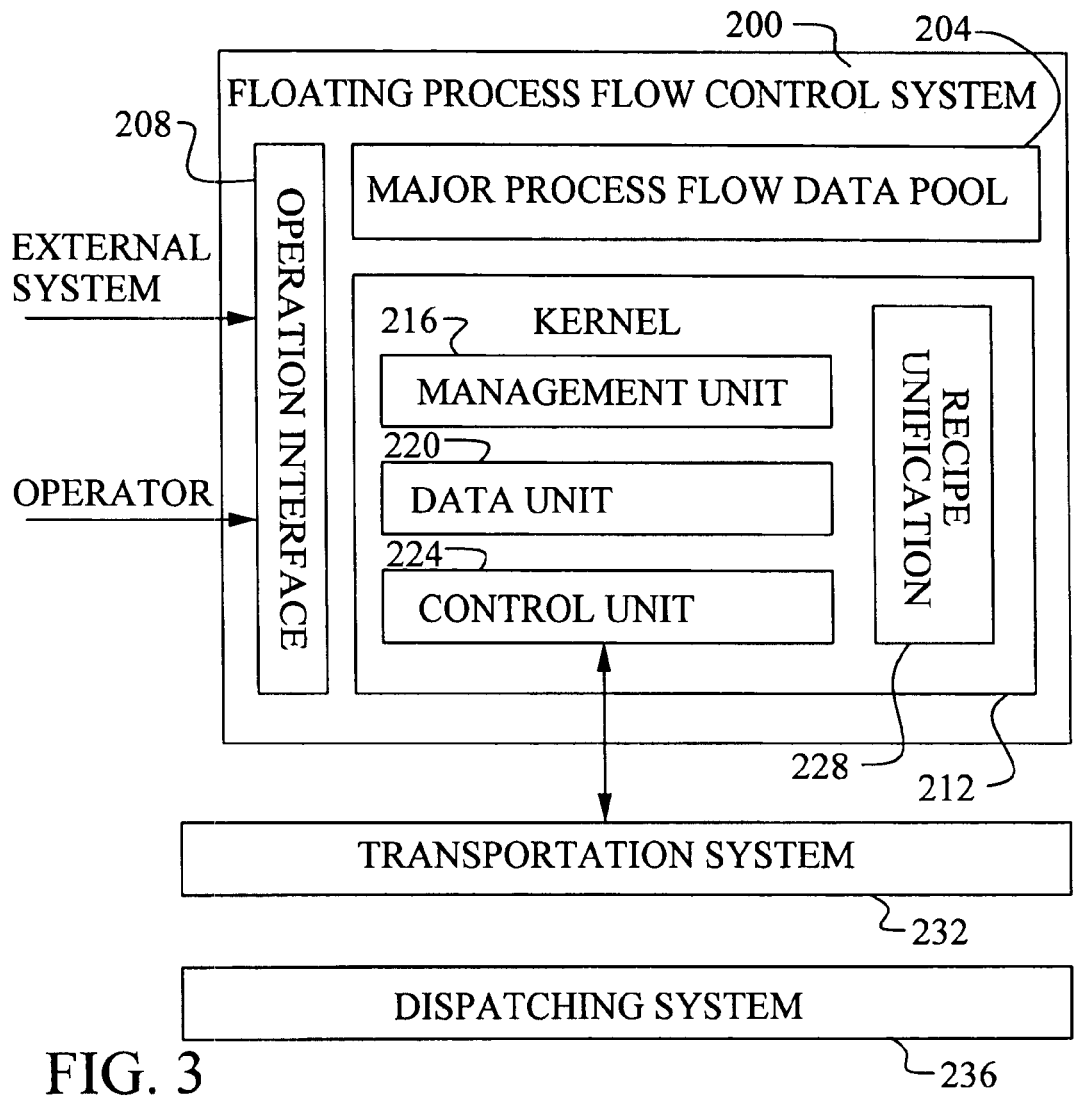
FIG. 3 further illustrates the system architecture of the present invention.
Figure 4:
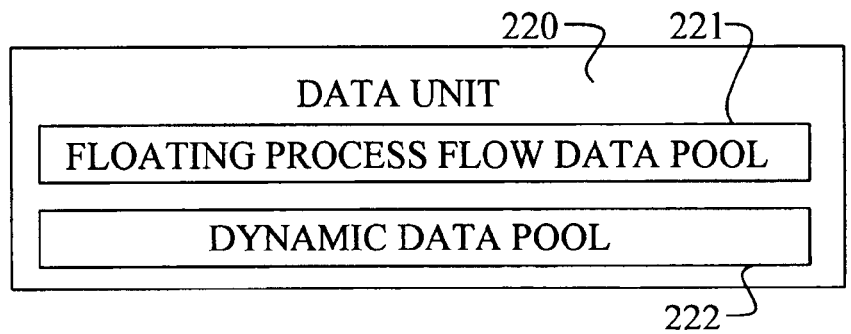
FIG. 4 illustrates a data unit.

Referring now to FIG. 3, a more detailed architecture for the floating process flow control system 200 is shown. The major process flow data pool 204 contains all the standard product process flows. The operation interface 208 comprises the means for the operator or for the equipment to notify the system 200 of an operation exception event as described above. The floating process flow kernel 212 comprises a management unit 216, a data unit 220, a control unit 224 and a recipe unification unit 228. The management unit 216 allows the process or specification engineer to create, update, and delete floating process flows. The management unit 216 preferably has an isolated user interface accessible to the specification management engineer. The data unit 220 preferably comprises the floating process flow pool 221 and a dynamic data pool 222 as shown in FIG. 4. The floating process flow pool 221 maintains the static, standard operating procedures (SOP) for each floating process corresponding to each type of operation exception event. The dynamic data pool 222 is used to temporarily store the connections established between the main process flows and the floating process flows during exception event servicing and to temporarily store floating process flows that are formed at run time by concatenating together smaller, sub-flows.

Referring again to FIG. 3, the control unit 224 coordinates the operation of the management unit 216, the data unit 220, and the recipe unification unit 228. The control unit 224 preferably acts like a neural system. The recipe unification unit 228 is used to unify floating process flows that have the same process capacity. Operation exception events can occur at many steps in the main product flows. Therefore, handling all the possible types of exceptions at all the possible entry points in the main flows can create a large number of floating process flows. To reduce the proliferation of floating process flows, it is preferred that the floating process flows be stored in the smallest, most common units or sub-flows. When an exception occurs, the recipe unification unit 228 then builds the floating process flow that will be used to process the exception by selecting and tying together the sub-flows. The recipe unification unit 328 selects sub-flows having the same process capacity to create an optimal floating process flow for the particular operation exception event in its context. As described above, the kernel 212 is connected to the transportation system 232 and to the dispatch system 236. The transportation system controls movement of the product lots from equipment-to-equipment, equipment-to-WIP storage, and WIP storage-to-equipment. The dispatch system 236 helps to optimize equipment utilization and process cycle time. Each product lot may have several equipment candidates for the next process step. The dispatch system 236 chooses the optimal tool.

Figure 5:
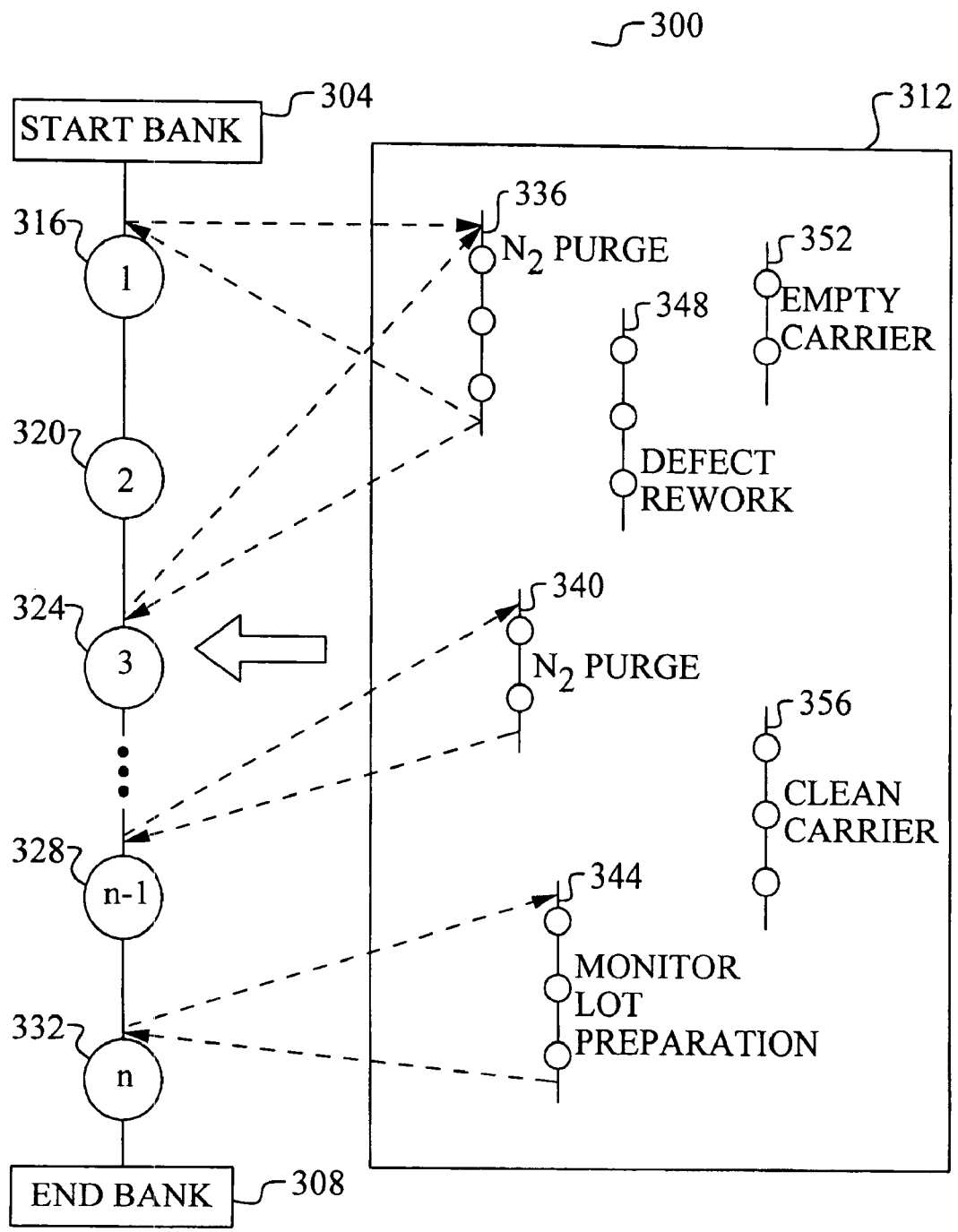
FIG. 5 illustrates a context diagram showing the relationship between the main process flow and floating process flows in the present invention.

Referring now to FIG. 5, a context diagram 300 is shown to further illustrate the concepts of the present invention. For an integrated circuit manufacturing plant, the product lots start in a start bank 304. When a product lot moves out of the start bank 304, it moves into the first step 316 in its process flow. The standard process flow for a product is illustrated by steps 1, 2, 3, ... n−1, and n as shown. After processing in step 1 316, the product moves to step 2 320, then to step 3 324, then continues until moving to step n−1 328 and finally to step n 332. After step n 332 is completed, the product lot moves into the end bank 308 which may be the end of all FAB processing or may be a holding area, such as prior to an upper metalization, for WIP awaiting final configuration.

As the product lot moves along the main process flow, operation exception events may occur. In this example, a first operation exception, an $N_2$ purge 336, occurs as the product is moved into the first step 316. In the present invention, the indication of a needed $N_2$ purge may be made by an operator mouse click at the operator GUI described above. In response to the exception, the control system of the present invention automatically accesses the floating process flow data pool 312. Note that the data pool 312 may contain several flows 336 and 340 that correspond to an $N_2$ purge. However, the system selects the $N_2$ purge floating flow 336 that corresponds to the equipment and/or product combination where the exception occurs. The control system makes the proper connection between the selected floating flow 336 and the main flow such that the next step for move in of the product lot becomes the first step in the $N_2$ purge flow 336. Next, the $N_2$ purge flow is automatically run using the automated operation of the equipment and transportation system. When the $N_2$ purge flow 336 is completed, then the next step is set for the step where the exception occurred which is, in this case, the first step 316 in the main flow.

Another exception occurs at the move in to the third step 324. Again, an $N_2$ purge flow 336 is required. At the move-in to the n−1 step 328, another $N_2$ purge exception is required. In this case, however, the $N_2$ purge fits a different floating flow 340 from the data pool 312. At the move-in to the n step 332, a monitor lot exception is encountered. The monitor lot preparation floating flow 344 is selected and automatically performed by the system. Other exception events illustrated include carrier replacement 352, product rework 348, and carrier cleaning 356.

Referring now to FIG. 6, a time sequence table 400 is illustrated to show how the system performs in a typical exception event. In the example, in step 1, the specification management engineer inputs a floating process flow into the floating process flow data pool using the management unit. The floating process flow is unified by the recipe unification unit. In step 2, the operation interface receives an external trigger and passes the notification to the control unit. The trigger may come from the operator or from the equipment. In step 3, the control unit extracts a proper floating process flow from the data unit and then connects this floating process flow to the standard process flow. In step 4, the control unit commands the transportation unit to move the lot to the process tool as specified by the first step in the floating process flow. In step 5, the lot processing proceeds along the floating process flow under the control of the automated dispatching system and the transportation system in full automation mode. Finally, in step 6, after completing the floating process flow, the lot is moved back to the standard process flow and the connection between the standard and floating flows is destroyed.

In yet another preferred embodiment of the present invention, the system may modify the floating process flow or sub-flow in response to an operation exception event to embed specific information into the recipe. Some recipe information can be included in the floating process flow data. For example, the process flow may specify a particular recipe name or identifier to be used in the tool during processing. Further, the recipe identifier may have an embedded token to specify product information, lot information, or equipment information. Alternatively, a recipe parameter may be included in the floating process flow information and this parameter may specify product information, lot information, or equipment information. An example of this token information is shown in Table 1 below where the product identifier is "TM1234A567", the reticle group is "1234120A", the available chambers are "1,2,3", the non-available chambers are "4", and the @ENERGY IS "042".

TABLE 1

A set of embedded tokens.

| Number | Embedded Token | Description | Example |
|---|---|---|---|
| 1 | {P6} | First 6 chars of product ID | ABC{p6}DEF→ ABCTM1234DEF |
| 2 | {P7} | First 7 chars of product ID | ABC{p7} ABCTM1234ADEF |
| 3 | {RG} | Reticle group | ABC{RG}DEF→ ABC1234120ADEF |
| 4 | {C} | All available chambers | ABC{C}DEF→ ABC123DEF |
| 5 | {Cddd} | Specific available chambers | ABC{C24}DEF→ ABC2DEF |
| 6 | {C(d1, d2)} | Chose one available group of specific chambers | ABC{C(12, 3) } DEF→ABC12DEF |
| 7 | {C[d1, d2]} | Chose all of available group of specific chambers | ABC{C(12, 3) } DEF→ABC123DEF |
| 8 | {@PARAM} | Replace tag by external parameter | ABC{@ENERGY} DEF→ABC042DEF |

TABLE 1. A set of embedded tokens.

The advantages of the present invention may now be summarized. An effective and very manufacturable method and an apparatus to control an automated manufacturing process are achieved. A control system suitable for an unmanned FAB is provided. A method to handle operation exceptions is provided. The product cycle time lost while waiting on operator or engineering action due to operation exceptions is reduced. The equipment efficiency is improved by continuing to process on full-automatic mode during operation exception events. The FAB throughput is increased. Engineering time is saved by reducing the number of possible process flows and conditions that must be maintained in the main process flow database.

As shown in the preferred embodiments, the novel method and apparatus of the present invention provides an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. A method to handle operation exceptions in an automated manufacturing system, said method comprising:
    providing an automated manufacturing system comprising a means to track progress of work in process against standard process flows and a means to select said product lots for processing from said work in process and to select equipment for processing said product lots based on next step information from said standard process flows;
    monitoring said automated manufacturing system for operation exception events wherein said product lots must deviate from said standard process flows;
    selecting a floating process flow corresponding to said operation exception event and said product lots from a floating process flow database;
    linking said floating process flow to said standard process flow such that said next step is derived from said floating process flow;
    thereafter continuing manufacturing using said floating process flow;
    unlinking said floating process flow and said standard process flow such that said next step is derived from said standard process flow when said floating process flow is completed.

2. The method according to claim 1 wherein said operation exception event comprises an operator interaction with said automated manufacturing system.

3. The method according to claim 2 wherein said operator interaction comprises a mouse click on a graphical user interface.

4. The method according to claim 1 wherein said operation exception event comprises an automated signal from said automated manufacturing system.

5. The method according to claim 1 wherein said operation exception event comprises an N2 purge, a carrier replacement, a product rework, a carrier cleaning, or a monitor lot preparation.

6. The method according to claim 1 wherein said step of selecting a floating process flow further comprises:
    selecting floating process sub-flows from said floating process flow database;
    constructing said floating process flow by linking together said floating process sub-flows; and
    modifying said floating process sub-flows to include information specific to said product lots and said equipment.

7. The method according to claim 6 wherein said step of selecting floating process sub-flows is based on selecting said floating process sub-flows having common capacities.

8. The method according to claim 6 wherein said step of modifying said floating process sub-flows further comprises embedding specific information into recipes in said floating process sub-flows.

9. The method according to claim 8 wherein said specific information is embedded into recipe identifiers or parameters.

10. An apparatus to control floating process flows in an automated manufacturing system, said apparatus comprising:
    an operation interface to monitor automated manufacturing system for operation exception events wherein said product lots must deviate from said standard process flows;
    a management unit to create, update, and delete floating process flows;
    a data unit to store said floating process flows; and
    a control unit to select said floating process flows corresponding to said operation exception events.

11. The apparatus according to claim 10 wherein said operation interface further comprises a graphical user interface capable of operator interaction.

12. The apparatus according to claim 10 wherein said operation interface further comprises an automated signal coupled between said apparatus and said automated manufacturing system.

13. The apparatus according to claim 10 wherein said operation exception event comprises an N2 purge, a carrier replacement, a product rework, a carrier cleaning, or a monitor lot preparation.

14. The apparatus according to claim 10 wherein said selecting a floating process flow further comprises:
   selecting floating process sub-flows from said floating process flow database;
   constructing said floating process flow by linking together said floating process sub-flows; and
   modifying said floating process sub-flows to include information specific to said product lots and said equipment.

15. The apparatus according to claim 14 wherein said step of selecting floating process sub-flows is based on selecting said floating process sub-flows having common capacities.

16. The apparatus according to claim 14 wherein said step of modifying said floating process sub-flows further comprises embedding specific information into recipes in said floating process sub-flows.

17. The apparatus according to claim 16 wherein said specific information is embedded into recipe identifiers or parameters.

18. An apparatus to control an automated manufacturing system, said apparatus comprising:
   a means to track progress of work in process against standard process flows;
   a means to select said product lots for processing from said work in process and to select equipment for processing said product lots based on next step information from said standard process flows; and
   a means to control floating process flows in an automated manufacturing system, said means comprising:
      an operation interface to monitor said automated manufacturing system for operation exception events wherein said product lots must deviate from said standard process flows;
      a management unit to create, update, and delete floating process flows;
      a data unit to store said floating process flows; and
      a control unit to select said floating process flows corresponding to said operation exception events.

19. The apparatus according to claim 18 further comprising a transportation system to automatically move said product lots without human intervention.

20. The apparatus according to claim 18 wherein said operation interface further comprises a graphical user interface capable of operator interaction.

21. The apparatus according to claim 18 wherein said operation interface further comprises an automated signal coupled to said automated manufacturing system.

22. The apparatus according to claim 18 wherein said selecting a floating process flow further comprises:
   selecting floating process sub-flows from said floating process flow database;
   constructing said floating process flow by linking together said floating process sub-flows; and
   modifying said floating process sub-flows to include information specific to said product lots and said equipment.

23. The apparatus according to claim 22 wherein said step of selecting floating process sub-flows is based on selecting said floating process sub-flows having common capacities.

24. The apparatus according to claim 22 wherein said step of modifying said floating process sub-flows further comprises embedding specific information into recipes in said floating process sub-flows.

25. The apparatus according to claim 24 wherein said specific information is embedded into recipe identifiers or parameters.

* * * * *